(12) United States Patent
Kuo

(10) Patent No.: US 7,556,416 B2
(45) Date of Patent: Jul. 7, 2009

(54) LIGHT-GUIDING STRUCTURE

(76) Inventor: Heng-Sheng Kuo, P.O. Box 26-757, Taipei 106 (TW)

( * ) Notice: Subject to any disclaimer, the term of this patent is extended or adjusted under 35 U.S.C. 154(b) by 0 days.

(21) Appl. No.: 11/906,964

(22) Filed: Oct. 5, 2007

(65) Prior Publication Data
US 2009/0091946 A1   Apr. 9, 2009

(51) Int. Cl.
*F21V 7/04* (2006.01)
(52) U.S. Cl. .................. 362/612; 362/623; 362/600; 362/611; 362/613; 362/615
(58) Field of Classification Search .......... 362/600–634
See application file for complete search history.

(56) References Cited
U.S. PATENT DOCUMENTS
2004/0075994 A1* 4/2004 Kuo ........................ 362/31
2007/0076433 A1* 4/2007 Kinoshita et al. ........... 362/615

* cited by examiner

*Primary Examiner*—Sandra L O'Shea
*Assistant Examiner*—Jessica L McMillan
(74) *Attorney, Agent, or Firm*—Rosenberg, Klein & Lee

(57) ABSTRACT

A light-guiding structure includes a light-guiding plate, and an LED set matched with the light-guiding plate. The characteristic is that the light-guiding plate has a light-entering surface, and there are a plurality of ditches on the light-entering surface. A light-entering interface is formed between two adjacent ditches. The LED set corresponds to the light-entering surface of the light-guiding plate, and each of the LEDs of the LED set corresponds to one light-entering interface. By utilizing the light-entering interface and the ditches, the light is uniformly spread. The light is uniformly spread at the light-entering surface of the light-guiding plate so that the bright point does not occur. The light is uniformly emitted from the light-emitting surface and the illumination is enhanced.

7 Claims, 6 Drawing Sheets

LIGHT-GUIDING STRUCTURE

BACKGROUND OF THE INVENTION

1. Field of the Invention

The present invention relates to a light-guiding structure. In particular, this invention relates to a light-guiding structure that uses the light-entering interface and the ditch to uniformly spread the light. Thereby, the light is uniformly spread at the light-entering side of the light-guiding plate, and the light is uniformly emitted from the light-emitting surface of the light-guiding plate and the illumination is enhanced.

2. Description of the Related Art

A backlight device includes a light-guiding module, a diffusion sheet, and a prism sheet (or a brightness enhancement film), etc. The light-guiding module includes a frame, a light source, a light-guiding plate, and a reflection cover.

The backlight device provides a backlight source to an apparatus, such as an LCD, a negative scanner, a slide projector, or an overhead projector, etc. The LCD is the major market for the backlight device, and the market rapidly grows as the LCD has been developed.

The backlight device uses a light-guiding plate to guide a spontaneous light source, such as a CCFL or an LED, and generates a big, uniform and bright light-emitting surface. The light of the spontaneous light source is reflected by the reflection cover and then emits from the light-emitting surface of the light-guiding plate. Therefore, the light uniformly emitted from the light-emitting surface is a basic factor for the backlight device.

Reference is made to FIGS. 1 and 2, which show the light-guiding structure of the prior art. The light-guiding structure includes a light-guiding plate 12a, and an LED set 14a. The LED set 14a has a circuit board 141a and a plurality of LEDs 142a located on the circuit board 141. The light-guiding plate 12a is received in the reflection cover (not shown in the figure) The LED set 14a is located on the reflection cover and corresponds to the light-entering surface 120a of the light-guiding plate 12a. In the light-guiding structure of the prior art, the LED set 14a emits light and the light emits into the light-entering surface 120a of the light-guiding plate 12a. The light is refracted and reflected, and emits from the light-emitting surface 121a of the light-guiding plate 12a.

However, because each of the LEDs (the spontaneous light source) is a point-shaped light source, a fluorescence symptom (the brightness on a single point is larger occurs, and the illumination of the fluorescence generated by each of the LEDs 142a is higher than the other area. Therefore, a bright point is generated at the light-entering surface 120a of the light-guiding plate 12a, and the light emitted from the light-emitting surface 121a is not uniform. It does not meet the requirement for the backlight device.

SUMMARY OF THE INVENTION

One particular aspect of the present invention is to provide light-guiding structure. A plurality of ditches and light-entering interfaces are formed on the light-guiding plate so that the light emits from each LED of the LED set passes through the ditch and the light-entering surface to achieve the uniform light-spreading and reflecting effect. Thereby, the bright point symptom occurred at the lighting location is eliminated. Furthermore, by forming different veins on the light-guiding plate, the light is uniformly spread in the light-guiding plate. Therefore, the light-guiding module uniformly emits the light from the light-emitting surface.

The light-guiding structure is used for a light-guiding module. The light-guiding structure includes a light-guiding plate, and an LED set matched with the light-guiding plate. The LED set has a plurality of LEDs. The characteristic is:

The light-guiding plate has a light-entering surface, and there are a plurality of ditches on the light-entering surface. A light-entering interface is formed between two adjacent ditches. The LED set corresponds to the light-entering surface of the light-guiding plate, and each of the LEDs corresponds to one light-entering interface.

Therefore, when each of the LEDs emits light, the light enters into the light-guiding plate via the light-entering interface, and the reflected light is uniformly spread by the ditch. Thereby, the brightness at the light-entering surface of the light-guiding plate is uniform, and the illumination is enhanced.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
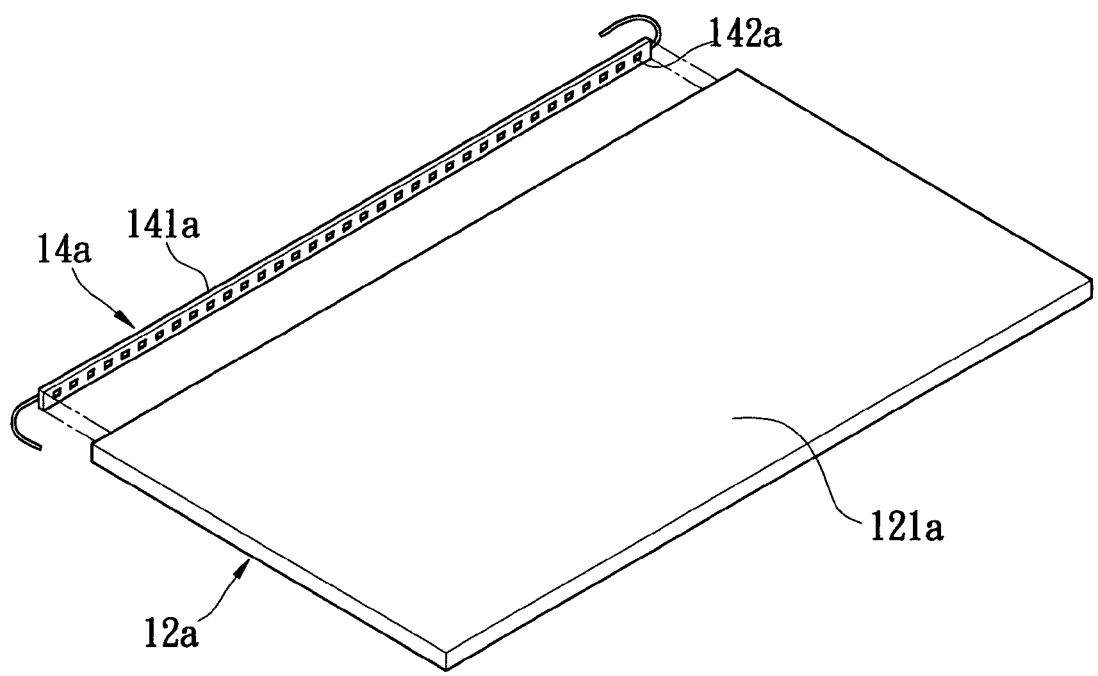
FIG. 1 is an exploded perspective view of the light-guiding structure of the prior art.
Figure 2:
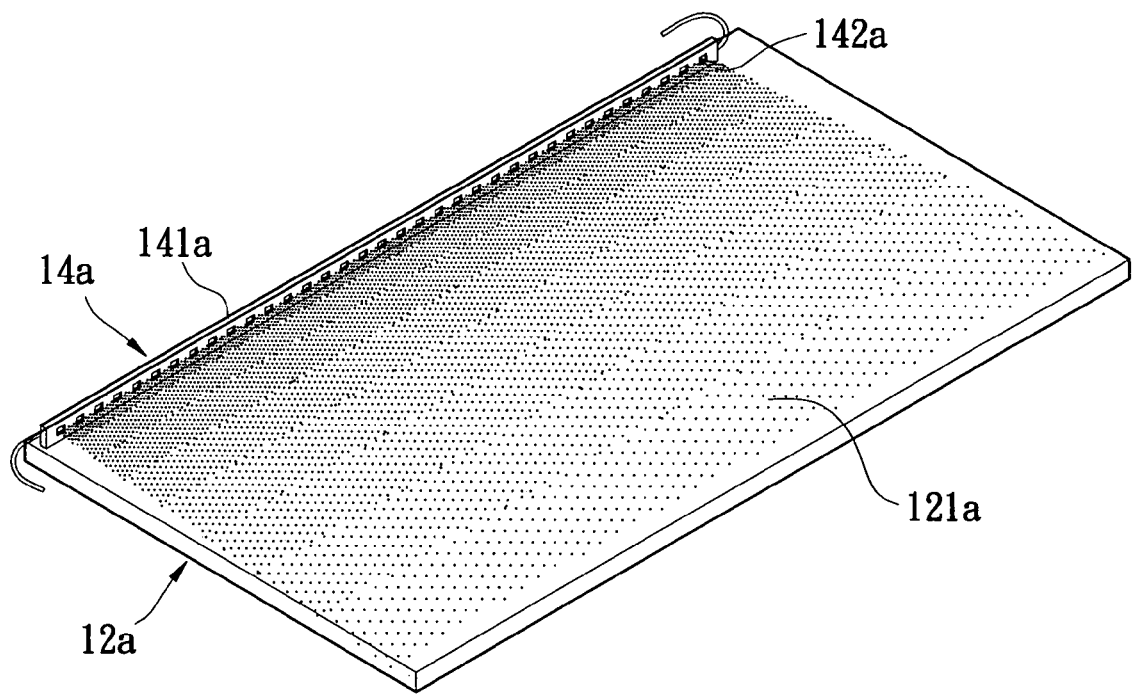
FIG. 2 is a schematic diagram of the light-guiding structure of the prior art being lighting.

Reference is made to FIGS. 3~9, which show the embodiments of the light-guiding structure of the present invention, and the corresponding relationships between the light-guiding plate and the LED. The light-guiding structure includes a light-guiding plate 1, and an LED set 2. The LED set 2 matches with the light-guiding plate 1. In this embodiment, the spontaneous light source is an LED set 2. Alternatively, a lamp set also can be used as the spontaneous light source.

The light-guiding plate 1 is received in a reflection cover (not shown in the figure). The light-guiding plate 1 has a light-entering surface 10, a first light-reflection surface 12, two second light-reflection surfaces 14 that are located in an opposite location, a light-emitting surface 16, a reflection surface 18 that is opposite to the light-emitting surface 16. The light-entering surface 10 of the light-guiding plate 1 has a plurality of ditches 101 and light-entering interfaces 102.

Each light-entering interface 102 is located between two adjacent ditches 101. In this embodiment, the shape of the ditch 101 can be semi-circular, V-shaped, rectangular, or arc, etc. The ditch 102 can uniformly spread the reflected light so that the light-entering surface 10 of the light-guiding plate 1 uniformly emits the light.

The LED set 2 has a circuit board 21 and a plurality of LEDs 22. The LEDs 22 are located on the circuit board 21.

The LED set 2 corresponds to the light-entering surface 10 of the light-guiding plate 1 for providing the light to the light-guiding plate 1. Each of the LEDs 22 respectively corresponds to one light-entering interface 102 located at the light-entering surface 10 for emitting the light and the light enters into the light-guiding plate 1 via the light-entering interface 102. When the light is reflected from the light-reflection surface 12, the second light-reflection surfaces 14 and the reflection surface 18, the light uniformly emits from the light-emitting surface 16.

When part of the reflected light is reflected to the light-entering surface 10, the reflected light is uniformly spread by utilizing the geometric shape of the ditch 101. Therefore, the brightness of the light-guiding plate 1 is enhanced and uniform. At the same time, the bright point symptom generated by the light at the light-entering surface 10 is eliminated.

Figure 3:
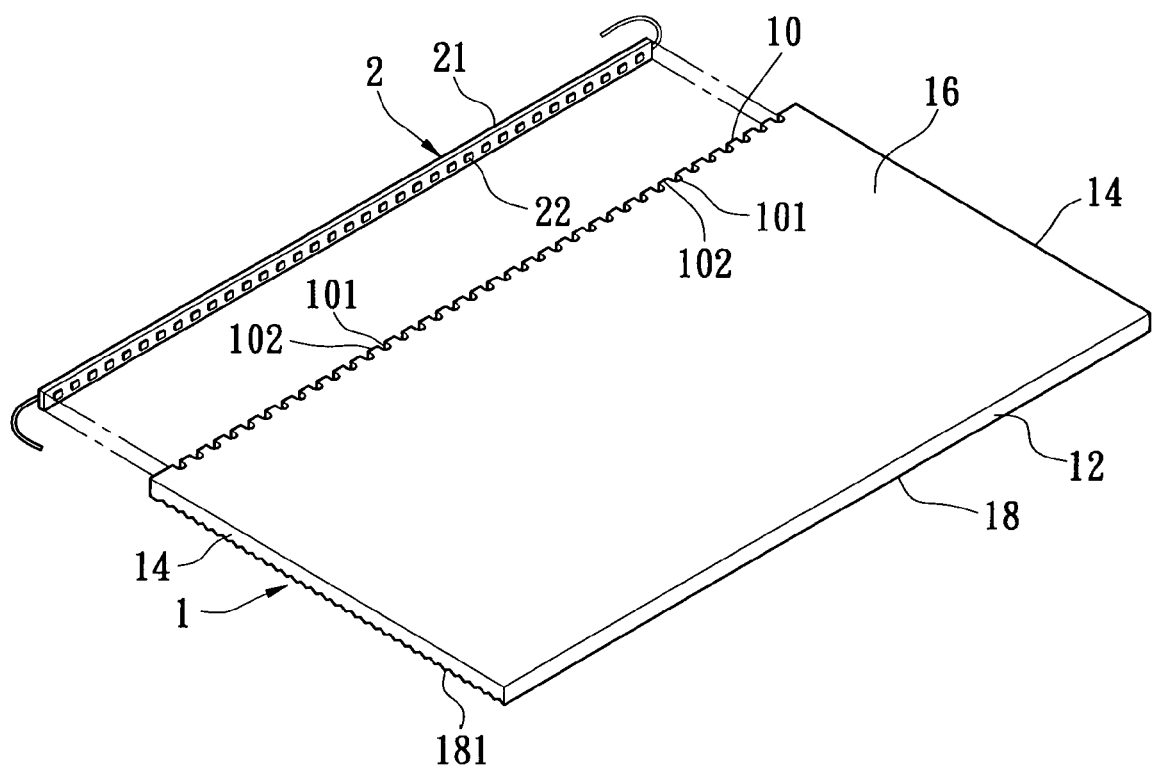
FIG. 3 is an assembly perspective view of the light-guiding structure of the first embodiment of the present invention.
Figure 4:
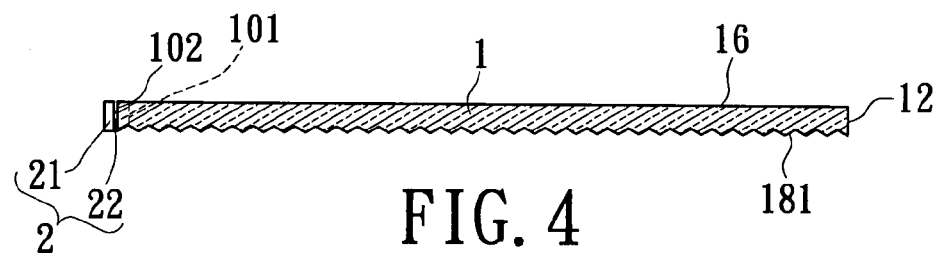
FIG. 4 is a schematic diagram of the light-guiding structure of the first embodiment of the present invention.
Figure 5:
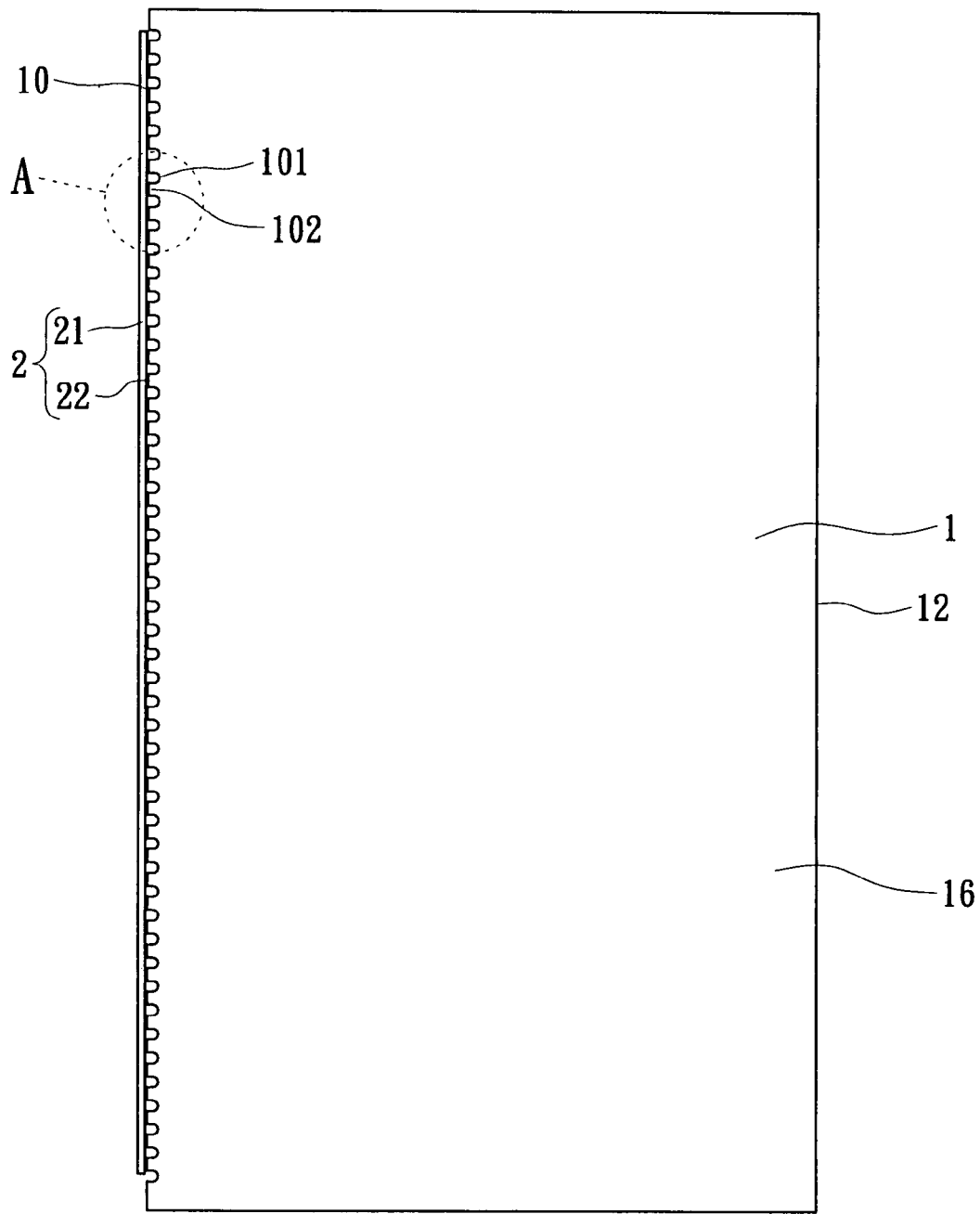
FIG. 5 is a top view of the light-guiding structure of the first embodiment of the present invention.

FIGS. 3~5 show the first embodiment of the light-guiding plate 1. The reflection surface 18 of the light-guiding plate 1 has a plurality of scraggy veins 181. The scraggy veins 181 can increase the refractive index of the light in the light-guiding plate 1 so that the light is uniformly spread in light-guiding plate 1. The shape of the scraggy veins 181 is regular or the scraggy veins 181 can be disposed regularly.

Figure 6:
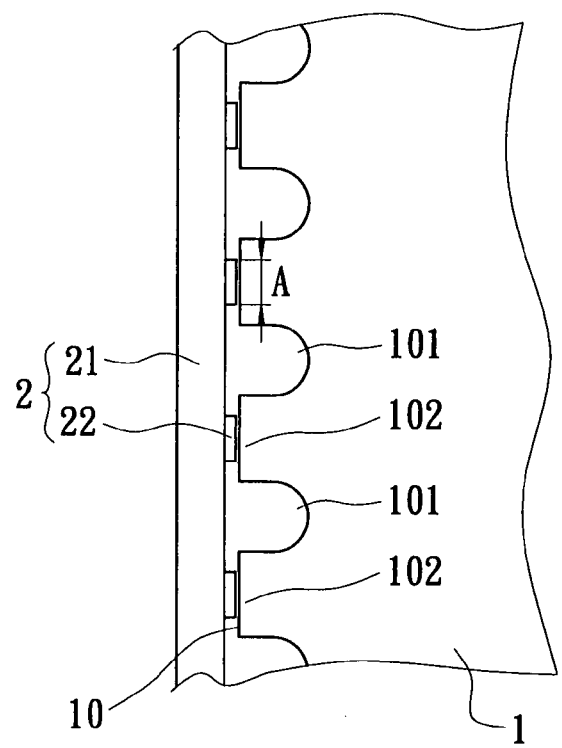
FIG. 6 is a schematic diagram of a corresponding relationship between the light-guiding plate and the LED in the light-guiding structure of the present invention.
Figure 7:
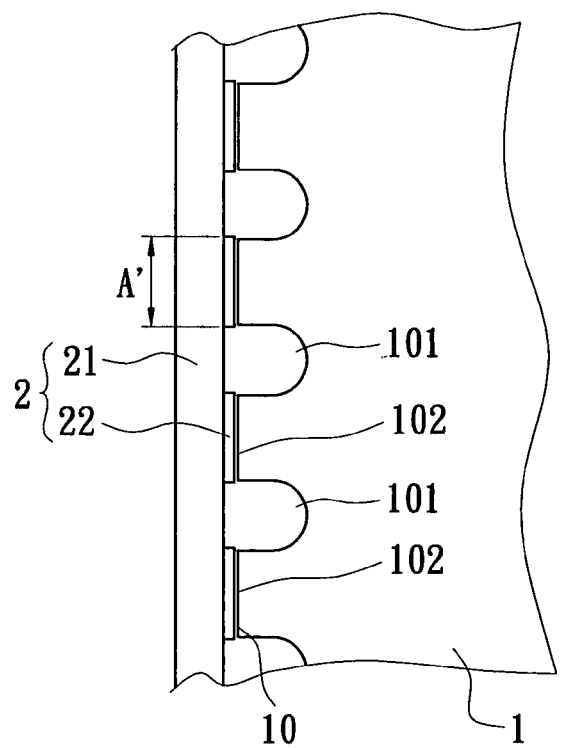
FIG. 7 is a schematic diagram of another corresponding relationship between the light-guiding plate and the LED in the light-guiding structure of the present invention.

FIGS. 6 and 7 show two schematic diagrams of the corresponding relationship between the light-guiding plate 1 and the LED 22. In FIG. 6, when each of the LEDs 22 of the LED set 2 corresponds to the light-entering interface 102, the surface area of the light-entering interface 102 is larger than the light-emitting area A of the LED 22. In FIG. 7, the surface area of the light-entering interface 102 is smaller than the light-emitting area A' of the LED 22. Therefore, the light-entering interface 102 can receives the light with different light-emitting areas. The light can be guided into the light-guiding plate 1 via the light-entering interface 102.

Figure 8:
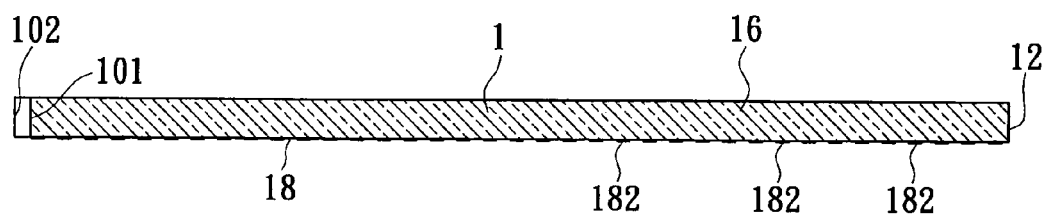
FIG. 8 is a schematic diagram of the light-guiding structure of the second embodiment of the present invention.

FIG. 8 shows the second embodiment of the light-guiding plate 1. Both the ditch 101 and the light-entering interface 102 are also included. The reflection surface 18 of the light-guiding plate 1 also has a plurality of printed veins 182 so that the light can be uniform spread in the light-guiding plate 1 and the light-emitting surface uniformly emits the light. The printed veins 182 can be formed by a printing method. The user can print the veins with different shape or dispose the veins according to their requirement.

Figure 9:
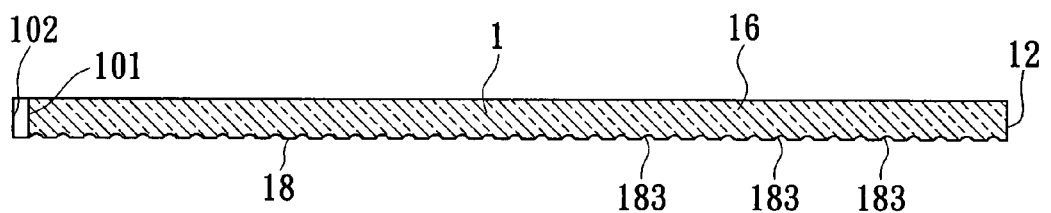
FIG. 9 is a schematic diagram of the light-guiding of the third embodiment of the present invention.

FIG. 9 shows the third embodiment of the light-guiding plate 1. Both the ditch 101 and the light-entering interface 102 are also included. The reflection surface 18 of the light-guiding plate 1 also has a plurality of carved veins 183. The shape of the carved veins 183 can be any type or the carved veins 183 can be disposed irregularly so that the light can be uniform spread in the light-guiding plate 1 and the light-emitting surface uniformly emits the light. The carved veins 183 can be formed by a carving method.

By utilizing the ditch 101, the light-entering interface 102, and the scraggy veins 181, the printed veins 182 or the carved veins 183 of the light-guiding plate 1, the light emitted from the LEDs 22 can be uniformly spread and refracted so that the bright point symptom will nor occur at the light-entering surface 10. At the same time, the light can be uniformly emitted from the light-emitting surface 16 of the light-guiding plate 1, and the illumination is enhanced to meet the requirement for the light-guiding module.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A light-guiding structure, used for a light-guiding module, comprising:
   a light-guiding plate; and
   an LED set, matched to said plate, comprising a plurality of LEDs and a circuit board;
   said plate comprising:
      a light-entering surface; having
      a plurality of flat light-entering interfaces, and a plurality of convex ditches disposed on the surface uniformly, which spreads light reflected inside the plate, providing uniform brightness at the surface;
      said light emitted by said LEDs into the plate via the light-entering interface;
      said interface formed between each of the plurality of ditches; and
      said LED set corresponding to said surface and each of said LEDs respectively disposed proximally corresponding to each said flat light-entering interface.

2. The light-guiding structure as claimed in claim 1, wherein the light-guiding plate further comprises:
   a light-emitting surface and a reflection surface opposite to the light-emitting surface, wherein a plurality of scraggy veins are formed on the reflection surface, uniformly spreading light in the light-guiding plate; said light uniformly emitted from the light-emitting surface.

3. The light-guiding structure as claimed in claim 1, wherein the light-guiding plate further comprises:
   a light-emitting surface and a reflection surface opposite to the light-emitting surface, wherein a plurality of printed veins are formed on the reflection surface, by a printing method, uniformly spreading light in the light-guiding plate; said light uniformly emitted from the light-emitting surface.

4. The light-guiding structure as claimed in claim 1, wherein the light-guiding plate further comprises:
   a light-emitting surface and a reflection surface opposite to the light-emitting surface, wherein a plurality of carved veins are formed on the reflection surface by a carving method, uniformly spreading light in the light-guiding plate; said light uniformly emitted from the light-emitting surface.

5. The light-guiding structure as claimed in claim 1, wherein the area of the light-entering interface is larger than the light-emitting area of the LED.

6. The light-guiding structure as claimed in claim 1, wherein the area of the light-entering interface is smaller than the light-emitting area of the LED.

7. The light-guiding structure as claimed in claim 1, wherein the shape of the ditch is semi-circular, V-shaped, rectangular or arc.

* * * * *